United States Patent
Oda et al.

(10) Patent No.: US 7,349,024 B2
(45) Date of Patent: Mar. 25, 2008

(54) IMAGING APPARATUS IN WHICH TYPE OF LIGHT SOURCE IS DISCRIMINATED TO CORRECTLY ADJUST WHITE BALANCE

(75) Inventors: Kazuya Oda, Saitama (JP); Takeshi Misawa, Saitama (JP); Hirokazu Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 776 days.

(21) Appl. No.: 10/807,300

(22) Filed: Mar. 24, 2004

(65) Prior Publication Data

US 2004/0189821 A1    Sep. 30, 2004

(30) Foreign Application Priority Data

Mar. 25, 2003  (JP) .............................. 2003-082085

(51) Int. Cl.
*H04N 5/222*  (2006.01)
(52) U.S. Cl. ..................... 348/370; 348/234; 348/294
(58) Field of Classification Search ............... 348/275, 348/223.1, 370–371, 294, 308
See application file for complete search history.

(56) References Cited

U.S. PATENT DOCUMENTS

| | | | | |
|---|---|---|---|---|
| 6,459,449 B1* | 10/2002 | Juen | ......................... | 348/223.1 |
| 6,515,275 B1* | 2/2003 | Hunter et al. | ................ | 250/226 |
| 6,803,955 B1* | 10/2004 | Yosida | ......................... | 348/272 |
| 7,030,916 B2* | 4/2006 | Aotsuka | ...................... | 348/272 |
| 7,148,920 B2* | 12/2006 | Aotsuka | ................... | 348/223.1 |
| 2004/0135899 A1* | 7/2004 | Suemoto | ................... | 348/223.1 |

FOREIGN PATENT DOCUMENTS

JP    4298175    * 10/1992

* cited by examiner

*Primary Examiner*—Lin Ye
*Assistant Examiner*—Gevell Selby
(74) *Attorney, Agent, or Firm*—Birch, Stewart, Kolasch & Birch, LLP

(57) ABSTRACT

Each pixel has a main pixel and a sub pixel. Each pixel has a color filter. The color filters are respectively arranged above a main photosensitive portion of the main pixel and a sub photosensitive portion of the sub pixel. The thickness of the color filters above the main and sub photosensitive portions is different from each other, so that spectral sensitivity characteristics of the main and sub photosensitive portions are respectively different. In a WB gain determiner, the type of illumination light source is judged by comparing image signals taken out from the main and sub pixels. The WB gain determiner determines a gain correction coefficient based on the type of illumination light source. The gain correction in each RGB color is performed according to the gain correction coefficient to adjust the white balance.

12 Claims, 8 Drawing Sheets

IMAGING APPARATUS IN WHICH TYPE OF LIGHT SOURCE IS DISCRIMINATED TO CORRECTLY ADJUST WHITE BALANCE

This Nonprovisional application claims priority under 35 U.S.C. § 119(a) on Patent Application No(s). 2003-082085 filed in JAPAN on Mar. 25, 2003, the entire contents of which are hereby incorporated by reference.

BACKGROUND OF THE INVENTION

1. Field of the Invention

The present invention relates to an imaging apparatus, and more particularly to an imaging apparatus in which white balance is correctly adjusted after the type of illumination light source has been discriminated.

2. Description of the Related Arts

An imaging apparatus including a digital still camera and an image input device is provided with a mechanism for adjusting white balance based on photographing under different illumination light sources having individual spectral characteristics, such as a tungsten light source, a fluorescent light, and daylight.

A white object photographed under illumination by arbitrary light source becomes achromatic. The white balance is adjusted by setting gain of R, G and B. For example, in the case of the digital still camera, it is common to adjust the white balance by setting the gain of R, G and B according to the spectral characteristics pattern, which is selected as the most approximate pattern to the predetermined pattern of each illumination light source including the tungsten light source, the fluorescent light and the daylight, after estimating roughly the spectral characteristics of the illumination light source by comparing the output level of the image signals of R, G and B taken out from the image sensor.

There has been known an image sensor having plural pixels in which each pixel has a main pixel and a sub pixel. The main pixel has a relatively large area, and the sub pixel has a relatively small area. It is advantageous in such an image sensor in terms of obtaining a high-quality photographic image by applying an interpolation process to the image signal from the main pixel by use of the image signal from the sub pixel after taking image signals from the main and the sub pixels. For example, if sensitivity difference between the main pixel and the sub pixel is utilized, it becomes possible to perform the interpolation process such as widening a dynamic range.

However, in the prior method for estimating the spectral characteristics from the output levels of image signals of R, G and B output from the image sensor, although it is possible to distinguish roughly the type of light source such as the tungsten light source and the fluorescent light, it is difficult to discriminate in detail the difference in the spectral characteristics based on the type of fluorescent light. Especially, since the spectral characteristics in each fluorescent light is varied according to each product, the predetermined spectral characteristics pattern and the spectral characteristics of the fluorescent light used as the illumination light source in the photographing are different. Therefore, there arises a problem in that the white balance cannot be adjusted correctly.

Additionally, in the imaging apparatus using the image sensor including the main pixel having a relatively large area and the sub pixel having a relatively small area, the discrimination accuracy for the illumination light source is the same as the case of an imaging apparatus using the image sensor including a single photosensitive portion since the main and the sub pixels according to the conventional imaging apparatus have the same spectral sensitivity characteristics.

SUMMARY OF THE INVENTION

An object of the present invention is to provide an imaging apparatus in which white balance is correctly adjusted by enhancing discrimination accuracy for an illumination light source.

In order to achieve the above object, in an image sensor, red, green and blue pixels are arranged in a predetermined pattern. Each pixel has a main pixel and a sub pixel of which the spectral sensitivity characteristics are different from each other. A different type of light source is discriminated by comparing a first signal read from the main pixel and a second signal read from the sub signal. In response to the type of light source, the white balance is adjusted.

In a preferable embodiment of the present invention, whether the ratio in each color approximately corresponds to a predetermined value is determined for each color after a first addition signal and a second addition signal are compared. If the ratio in one of the colors is widely different from the predetermined value, the illumination light source is judged as a different type of light source. Specifically, when the value integrated a sensitivity coefficient to the second addition signal approximately corresponds to the first addition signal, the illumination light source is judged as a normal illumination light source. If it does not correspond, the illumination light source is judged as the different type of light source. Meanwhile, the kind of different type of light source is discriminated in accordance with the difference between the first addition signal and the value calculated by multiplying the sensitivity coefficient to the second addition signal used for judgment.

The spectral sensitivities of the main and sub pixels are changed by differentiating thickness of a color filter, or thickness of a main photosensitive portion of the main pixel and a sub photosensitive portion of the sub pixel.

According to the present invention, the type of light illumination source is judged by comparing the image signals from the main and the sub pixels with each other, so that the discrimination accuracy can be enhanced. Accordingly, the white balance can be adjusted correctly.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
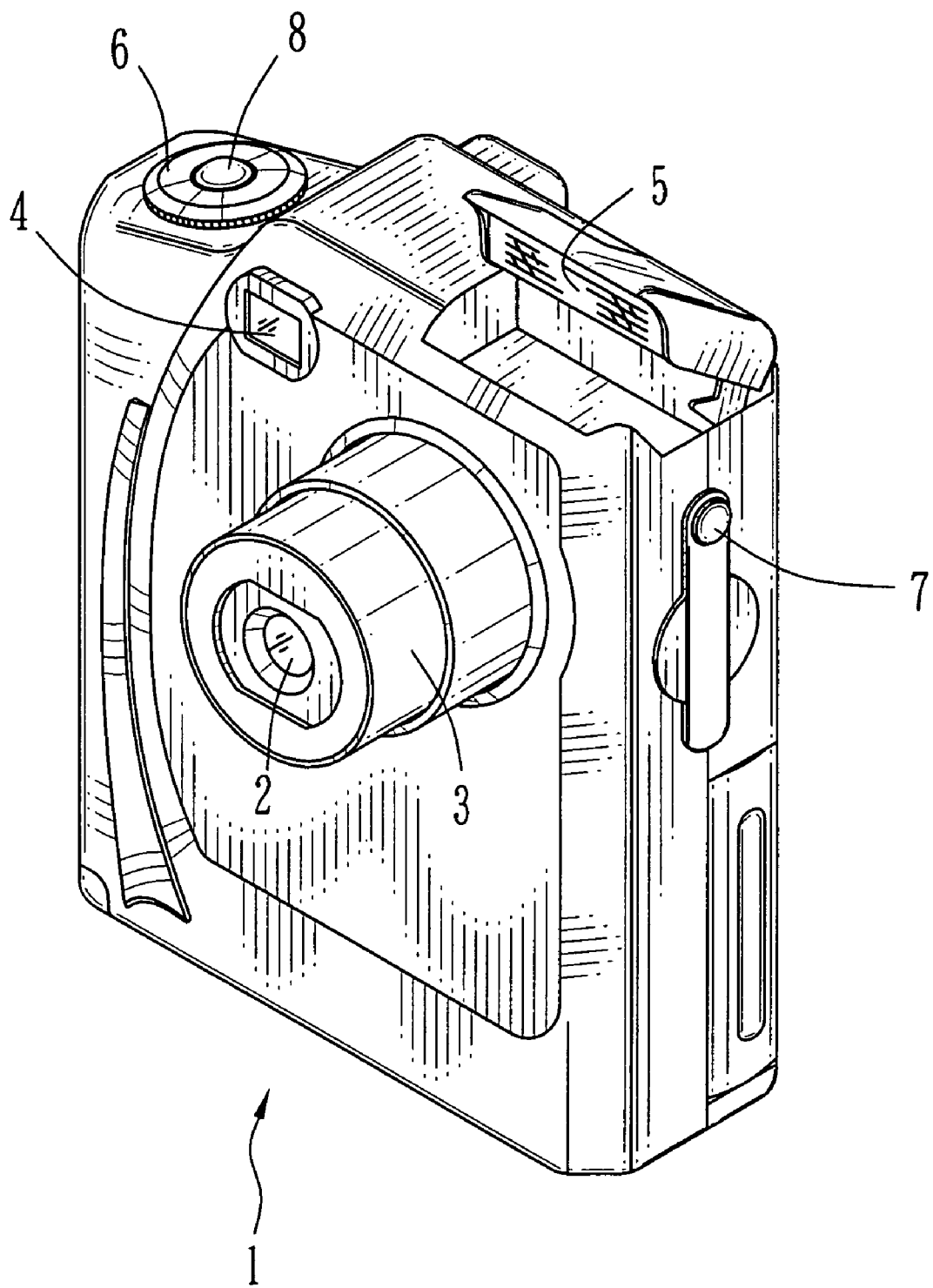
FIG. 1 is a front perspective view of a digital still camera to which the present invention is applied.

In FIG. 1, there are a lens barrel 3 holding a taking lens 2 and an optical viewfinder 4 in a front surface of a digital still camera 1. A popup type flash emitter 5 and a functional dial 6 are provided in a top surface of the digital still camera 1. The popup type flash emitter 5 is popped up from the top surface of the digital still camera 1 by operating a pop-up button 7, which is provided on a side surface of the digital still camera 1. The flash emitter 5 is pressed down manually to be contained in the original position. When exposure adjustment and focusing are performed, the functional dial 6 is used for switching a manual adjusting mode and an automatic adjusting mode corresponding to a predetermined photographic pattern such as long or short distance photographing and indoor photographing. A release button 8 is provided in a center of the functional dial 6.

Figure 2:
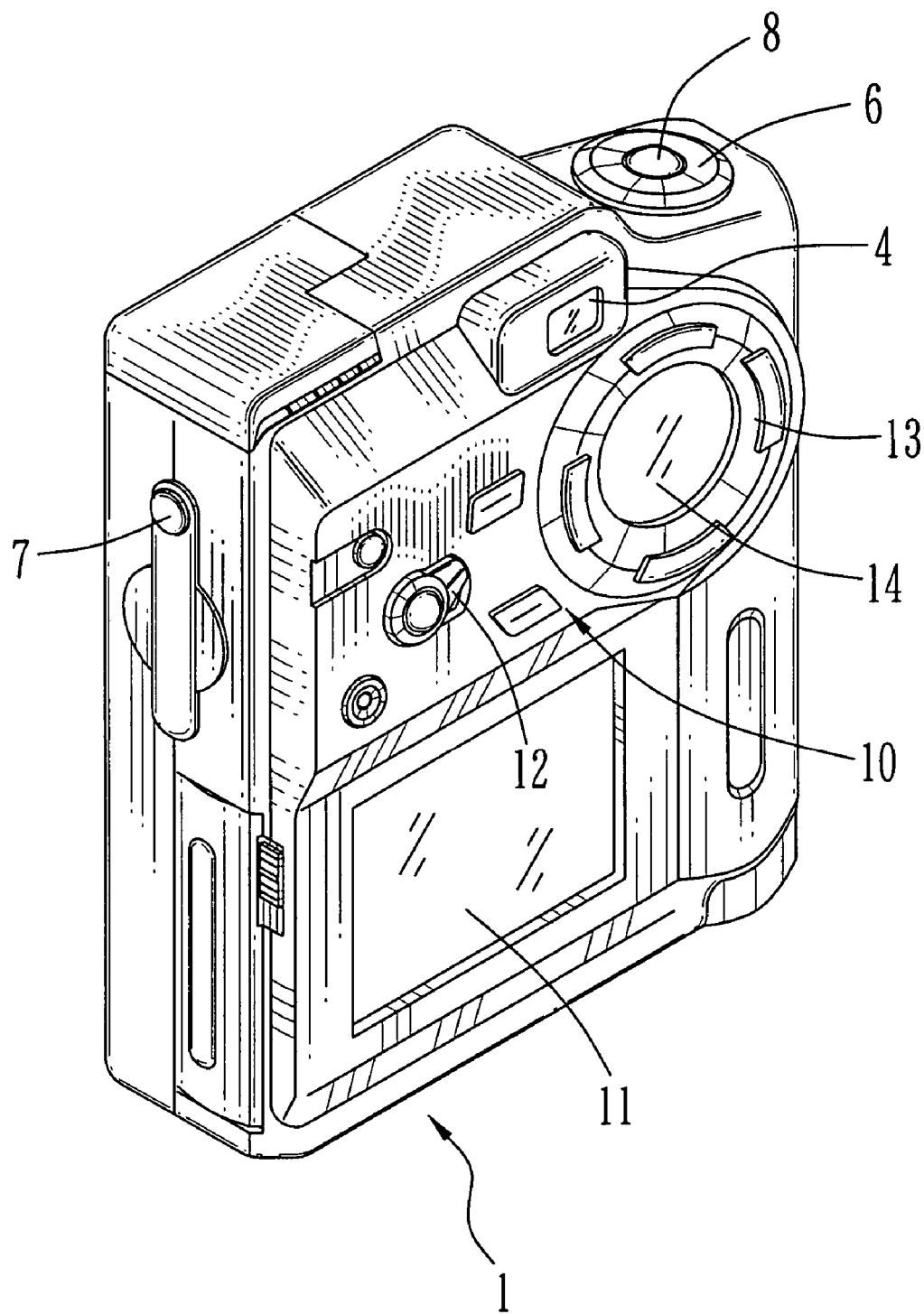
FIG. 2 is a rear perspective view of the digital still camera.

In FIG. 2, an operating panel 10 in which various switch buttons are arranged and a liquid crystal display 11 capable of full-color display are provided in a rear surface of the digital still camera 1. The operating panel 10 is provided with a mode switching lever 12 operated to switch a taking mode and a reproduction mode. The liquid crystal display 11 is used as an electric viewfinder to display an image of an object in the taking mode, while in the reproduction mode the liquid crystal display 11 is used to reproduce the taken object image. A cross key 13 is operated to adjust the exposure adjustment manually or to set image resolution. The various setting conditions can be confirmed on a reflection type liquid crystal panel 14 for a black and white display.

Figure 3:
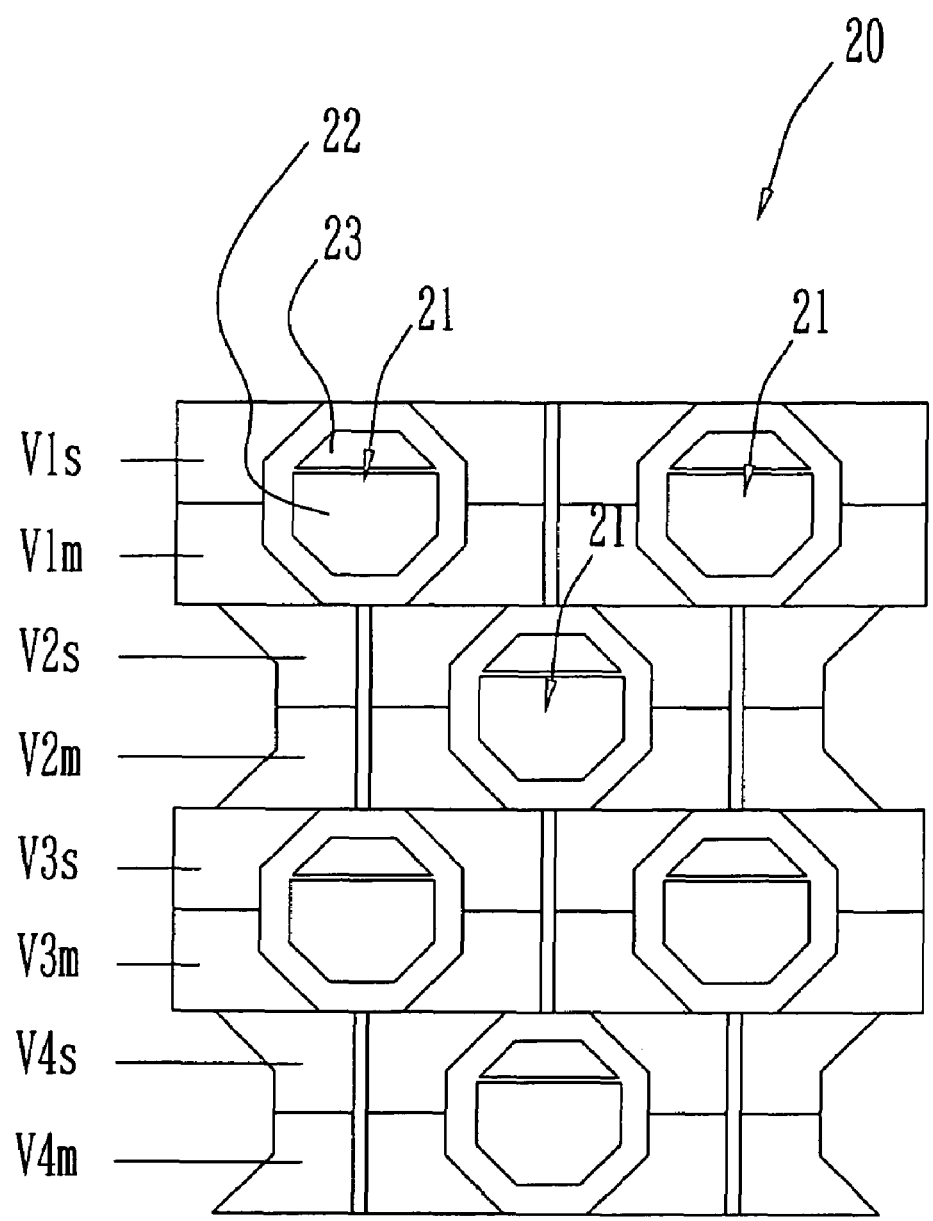
FIG. 3 is a plane schematic view explaining an image sensor.

As shown in FIG. 3, a CCD 20 as an image sensor has a pixel area in which a large number of pixels 21 are arranged in rows and in columns. Each pixel 21 is provided with a main pixel 22 and a sub pixel 23, and arranged in every other column and every other row, which means that the pixel area has a honeycomb structure. Transfer electrodes V1s - V4m are connected to each pixel 21, and each transfer electrode is connected to a vertical charge transfer path (VCCD) 24 shown in FIG. 4. Furthermore, the VCCD 24 is connected to a horizontal charge transfer path (HCCD) which is not shown. An image signal taken out from the transfer electrode is transferred through the VCCD 24 and HCCD, and then output from the CCD 20 to produce the taken image by applying various signal processings thereto. The image signal is read out from the main pixel 22, and then read out from the sub pixel 23. When the image pixel 21 is exposed, a reading gate pulse is applied to the transferred electrodes V1m, V2m, V3m and V4m to read out the image signal from the main pixel 22. The image signal transferred by the VCCD 24 and HCCD is transferred to output the image signal from the CCD 20. After the image signal has been read out from the main pixel 22, the image signal of the sub pixel 23 is read out by applying the reading gate pulse to the transfer electrodes V1s, V2s, V3s and V4s. Likewise, the image signal is transferred by the VCCD 24 and HCCD, and then output from CCD 20.

Figure 4:
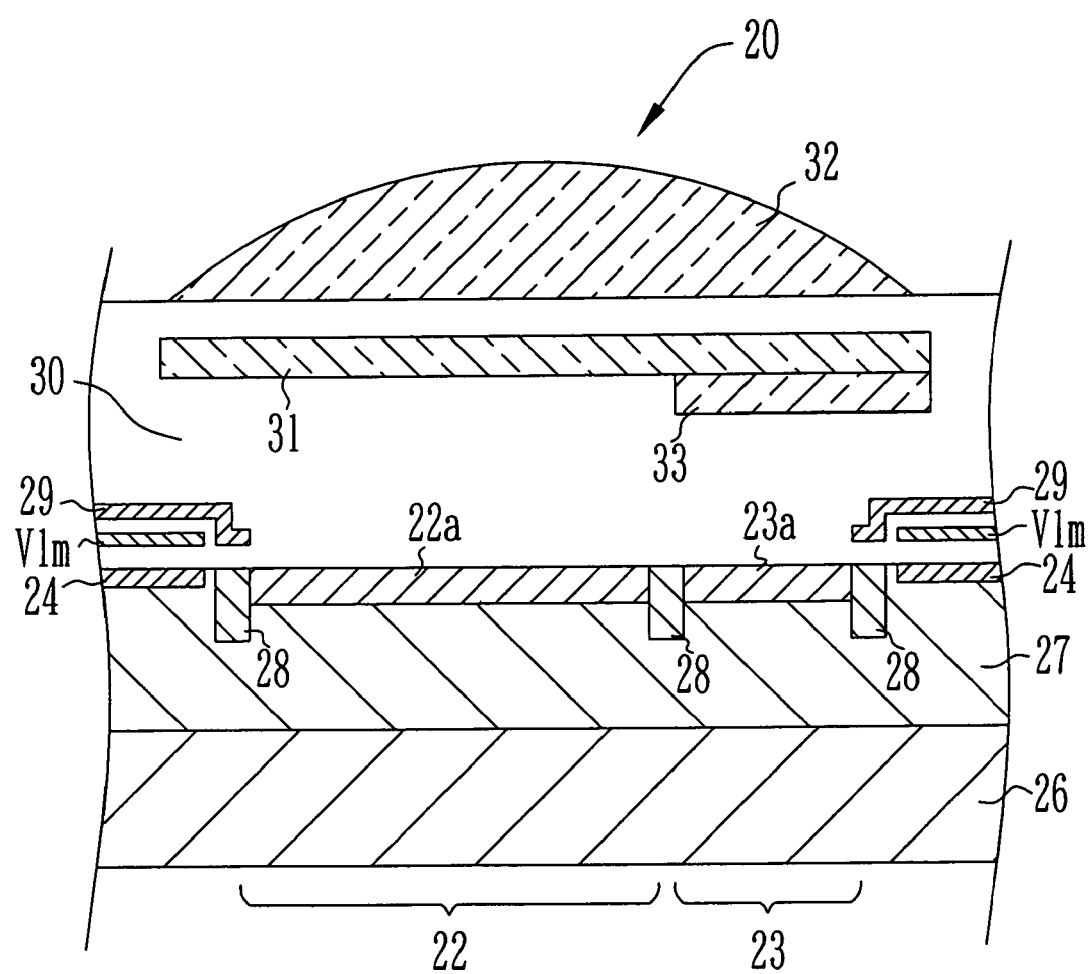
FIG. 4 is a cross-sectional schematic view explaining the image sensor.

As shown in FIG. 4, in the CCD 20, a p-type well 27 is formed on a n-type semiconductor substrate 26. A main photosensitive portion 22a, a sub photosensitive portion 23a, and the VCCD 24 are provided in the p-type well 27. There are channel stop regions 28 for electrically separating between the main photosensitive portion 22a, the sub photosensitive portion 23a and the VCCD 24.

A light-shielding film 29, formed above the transfer electrodes V1s and V1m, keeps the VCCD in light-tight manner such that subject light is not photoelectrically converted in the VCCD 24. A first color filter 31 and a microlens 32 are provided above the main and the sub photosensitive portions 22a, 23a so that a planarizing layer 30 lies between those.

A second color filter 33 having the same color as the first color filter 31 is provided above the sub photosensitive portion 23a. The thickness of the color filters on the main and the sub photosensitive portion 22a, 23a is respectively different, so that it becomes possible to differentiate the respective spectral sensitivity characteristics of the main and the sub photosensitive portions 22a, 23a.

The pixel 21 is constituted of the microlens 32 and the main and the sub pixels 22, 23. The main pixel 22 is constituted of the main photosensitive portion 22a and the first color filter 31. While, the sub pixel 23 is constituted of the sub photosensitive portion 23a and the first and the second color filters 31, 33.

In the CCD 20, plural red, green and blue pixels are two-dimensionally arranged in a predetermined pattern. The red pixels have a red filter and convert red light photoelectrically. The green pixels have a green filter and convert green light photoelectrically. The blue pixels have a blue filter and convert blue light photoelectrically.

Figure 5:
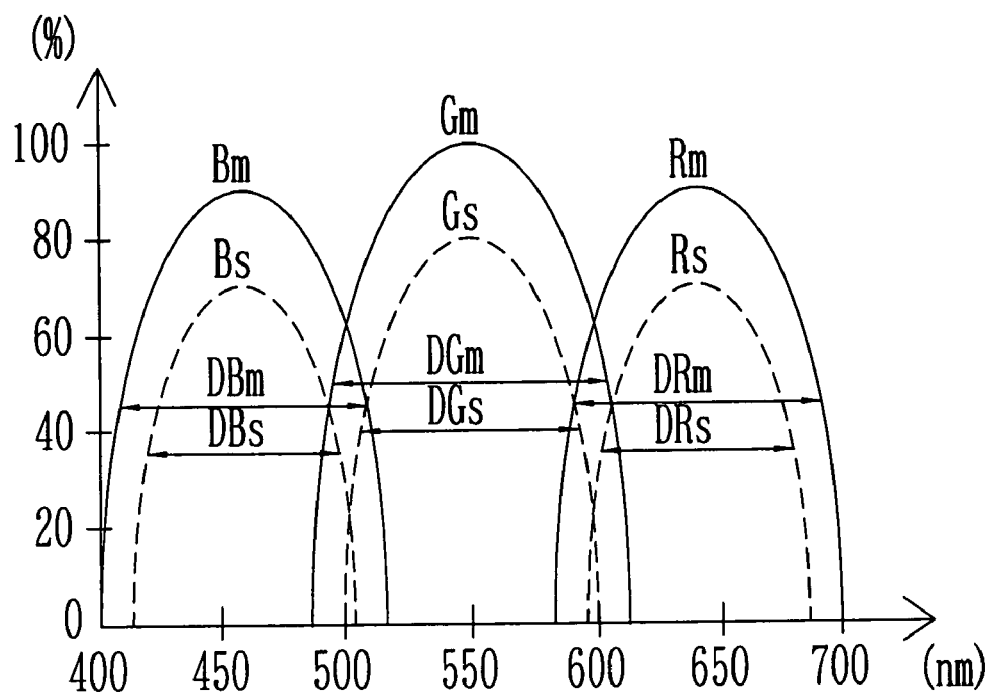
FIG. 5 is an explanatory view showing an example of spectral sensitivity characteristics of main and sub pixels.

As shown in FIG. 5, with respect to the spectral sensitivity characteristics of the main photosensitive portion 22a for receiving the object light, which has been passed through the first color filter 31, the spectral sensitivity characteristics in blue, green and red regions are respectively shown as Bm, Gm and Rm. Meanwhile, with respect to the spectral characteristics of the sub photosensitive portion 23a for receiving the object light, which has been passed through the first and the second color filters 31, 33, the spectral sensitivity characteristics in the blue, green and red regions are respectively shown as Bs, Gs and Rs.

If a half-width of the spectral sensitivity characteristics applies to a wave-length range in which each photosensitive portion receives the light, the wave-length ranges in which the main and the sub photosensitive portions 22a, 23a receive the light in the RGB colors are respectively different. In the drawing, each half-width of Bm, Gm and Rm is shown as DBm, DGm and DRm. In a similar way, each half-width of Bs, Gs and Rs is shown as DBs, DGs and DRs. In the same drawing, although the light is received in the main photosensitive portion 22a in the blue and the green regions since such light having the wavelength of 500 nm is included within the light receiving ranges of DBm and DGm, the light having the wavelength of 500 nm is not included within the light receiving ranges of DBs and DGs, so that such light is not received by the sub photosensitive portion 23a. Likewise, although the light is received in the main photosensitive portion 22a in the green and the red regions since such light having the wavelength of 600 nm is included with in the light receiving ranges of DGm and DRm, such light having the wave length of 600 nm is not included within the light receiving ranges of DGs and DRs, so that such light is not received by the sub photosensitive portion 23a.

Figure 6:
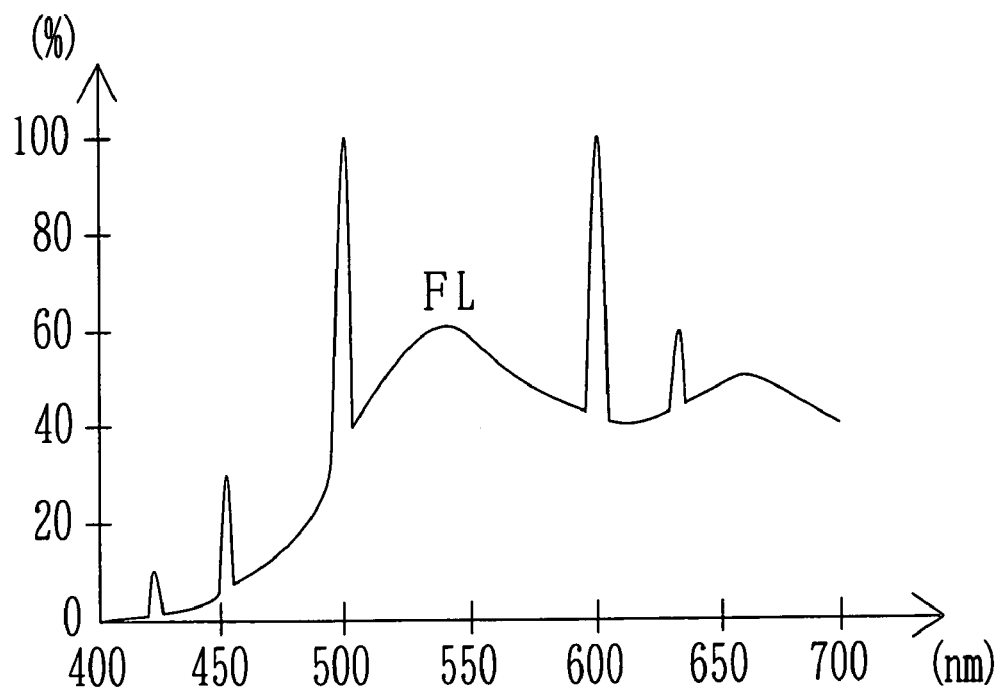
FIG. 6 is an explanatory view showing an example of a spectral characteristics of a fluorescent light.

The fluorescent light has a bright line spectrum in a certain wavelength. As shown in FIG. 6, for example, the spectral characteristics FL of the fluorescent light has the bright line spectrum in the wavelength of 500 nm and 600 nm. In the event of photographing by use of such fluorescent light as the illumination light source, since the signal level of the main photosensitive portion 22a receiving the wavelength of 500 nm and 600 nm including the bright line spectrum and the signal level of the sub photosensitive portion 23a in which such wavelength is not received are widely different, it is possible to discriminate the type of fluorescent light by comparing the signal levels of the image signals from the main and the sub photosensitive portions 22a, 23a with each other.

Especially, the type of fluorescent light can be correctly discriminated by detecting the wavelength in which the bright line spectrum is generated since each type of fluorescent light has an individual bright line spectrum, so that it becomes possible to adjust the white balance correctly. In addition, with respect to the illumination light source except the fluorescent light, the discrimination with high accuracy can be performed by comparing the signal levels of the image signals of the main and the sub photosensitive portions 22a, 23a with each other.

Figure 7:
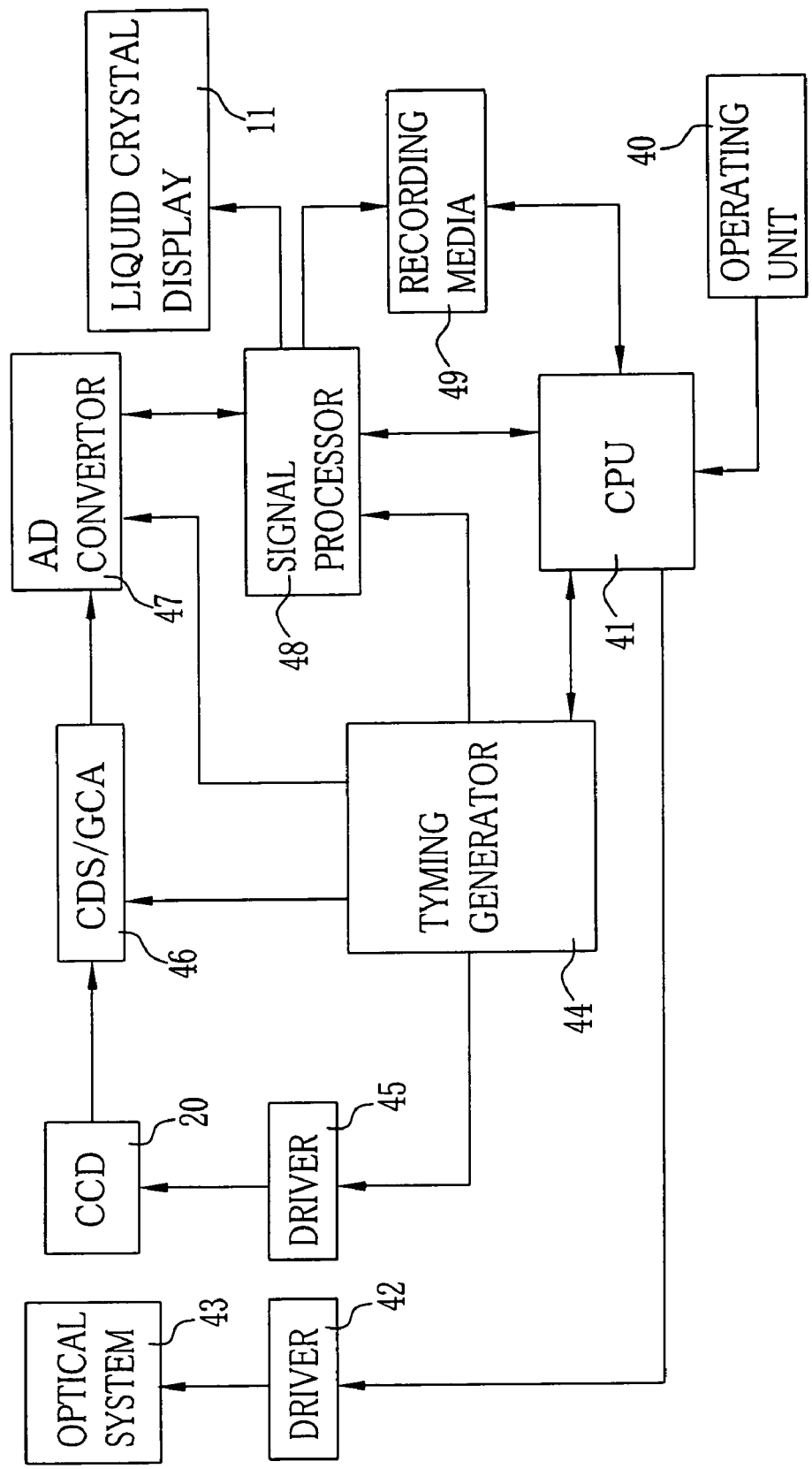
FIG. 7 is a block diagram showing a process of an image signal processing.

In FIG. 7, when operating the operating unit 40, which is constituted of the functional dial 6, the release button 8, the operating panel 10 and so forth, photographing is performed by the CCD 20 after an optical system 43 including the taking lens 2 and the lens barrel 3 has been driven by a CPU 41 through a driver 42.

When the photographing has been finished, the CPU 41 drives a driver 45 through a timing generator 44 to apply the reading gate pulse to the transfer electrodes, V1m, V2m, V3m and V4m of the CCD 20. An electric charge of the main photosensitive portion 22a is taken out from the CCD 20 through the VCCD 24 and the HCCD by application of the leading gate pulse, and then the electric charge is transferred to a CDS/GCA section 46. After reading out the image signal completely from the main photosensitive portion 22a, the image signal from the sub photosensitive portion 23a is read out by applying the reading gate pulse to the transferred electrodes V1s, V2s, V3s and V4s, and then the image signal is transferred from the CCD 20 to the CDS/GCA section 46.

In the CDS/GCA section 46, noise contained in the image signal from the CCD 20 is removed by a correlated double sampling operation, and the level of the image signal is optimized by a gain control amplifier. After applying the CDS/GCA processing to the image signal, the image signal is converted to a digital signal by an A/D converter 47.

The image signal converted to the digital signal by the A/D converter 47 is transferred to a signal processor 48. The signal processor 48 performs a comparison calculation of each image obtained from the main and the sub photosensitive portions 22a, 23a to calculate the correction values for each color for adjusting the white balance in the photometry. Also, if necessary, in the photographing the signal processor 48 applies the processing such as a wide dynamic range to the image obtained from the main photosensitive portion 22a. Then the image data is recorded in a recording media 49. The pulse signal used in all the signal processings from the reading of the image signal from the CCD 20 to the interpolation process in the signal processor 48 is synchronized with a reference clock by the timing generator 44, so that each signal processing can be performed under the optimum conditions.

Figure 8:
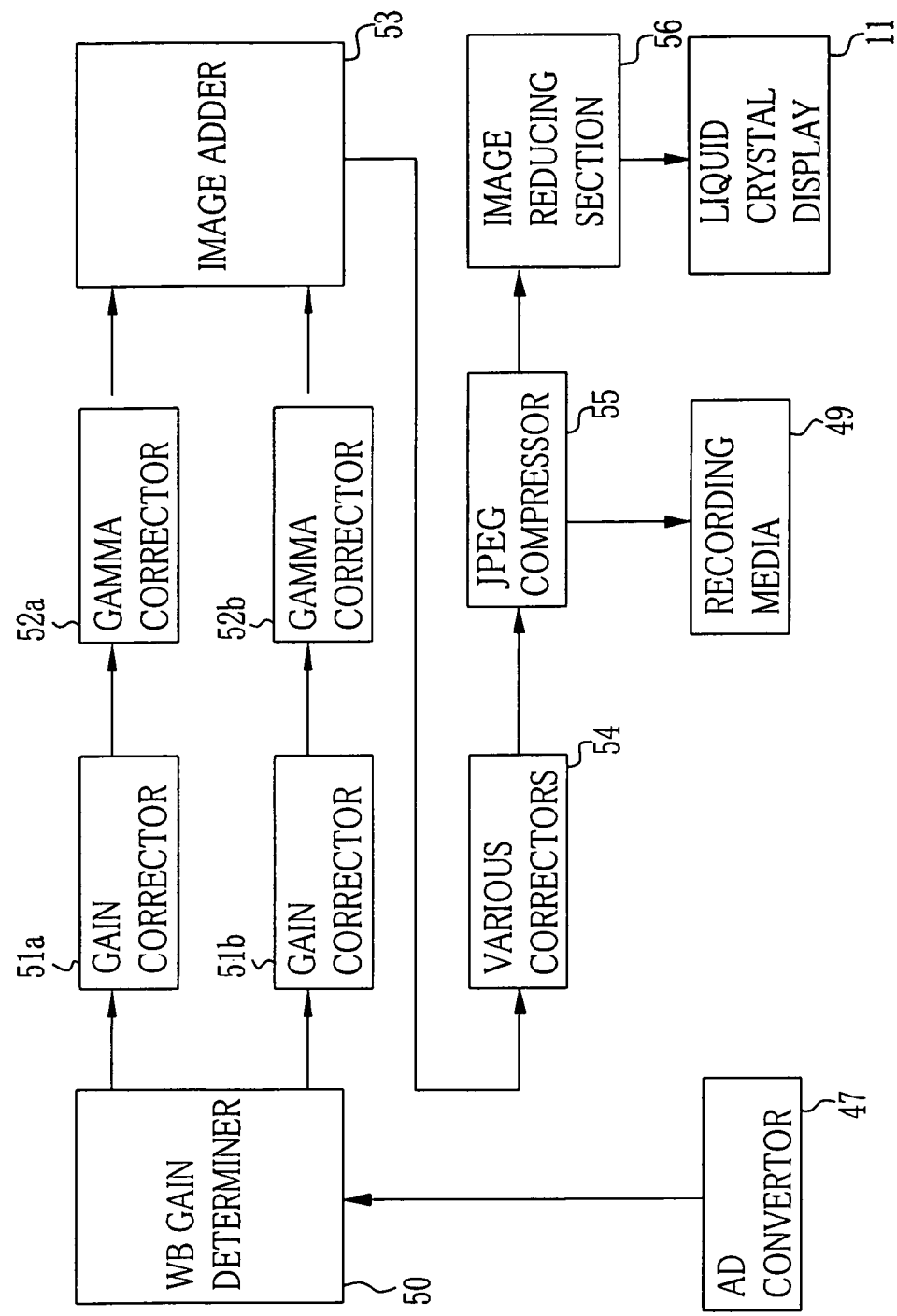
FIG. 8 is an explanatory view showing a process of a signal processing in a signal processor.

In FIG. 8, the image signal taken out from the CCD 20 upon photometry is transferred to a WB gain determiner 50 after the image signal has been converted to the digital signal by the A/D converter 47. In the WB gain determiner 50, the signal levels obtained from the main and the sub pixels 22, 23 are respectively integrated for each RGB color. Then, the integrated values of each color in the main and the sub pixels 22, 23 are respectively compared with each other. Thereafter, the type of illumination light source is judged based on the ratio calculated by comparing the integrated values. In accordance with the type of illumination light source, gain correction coefficients in each color of the main and the sub pixel 22, 23 are respectively determined.

As the comparing method, for example, if the integrated value M of the signal level in the main pixel approximately equals to the integrated value S of the signal level in the sub pixel x a sensitivity coefficient a, the light source is judged as a normal illumination light source (e.g. sunlight). On the other hand, if the integrated value M of the signal level in the main pixel is different from the integrated value S of the signal level in the sub pixel x the sensitivity coefficient a, the light source is judged as a different type of light source (e.g. the fluorescent light). The kind of the different type of light source is discriminated based on the difference in value. Note that the sensitivity coefficient α is determined by the design of the imaging apparatus such as the thickness of the color filter. When comparing the values for each color, if one of the three colors, for example green, satisfies the above-mentioned condition in the different type of light source, the illumination light source is judged as the different type of light source.

When the photometry has been finished, gain correction coefficients of the main and the sub pixels 22, 23 for the RGB colors are determined by the WB gain determiner 50. Then, the image signals taken out from the main and the sub pixels 22, 23 are respectively converted to the digital signals by the A/D converter 47 after photographing. Thereafter, with respect to the image signal from the main pixel 22, the gain correction of the RGB colors is carried out to adjust the white balance in a WB gain correcting section 51a based on the gain correction coefficient determined by the WB gain determiner 50. In the same way, the image signal from the sub pixel 23 is subject to gain correction process in a gain correcting section 51b based on the gain correction coefficient determined by the WB gain determiner 50. Since the memory stores the gain correction coefficients of the RGB colors corresponding to the illumination light source, the gain correction coefficient corresponding to the type of illumination light source is read out from the memory.

The image signals from the main and sub pixels 22, 23 output from the gain correcting sections 51a and 51b are synthesized pixel by pixel by an image adder 53 after gamma correction in gamma correcting sections 52a, 52b. At that time, the process such as widening the dynamic range is performed, if necessary. After a contour correction and a color tone correction by various correctors 54, the synthesized taken image is compressed in JPEG format and recorded in the recording media 49. Meanwhile, a thumbnail image is displayed on the liquid crystal display 11 after an image deduction processing has been carried out in an image reducing section 56. The image or the thumbnail image becomes high in quality by performing the white balance adjustment correctly.

Figure 9:
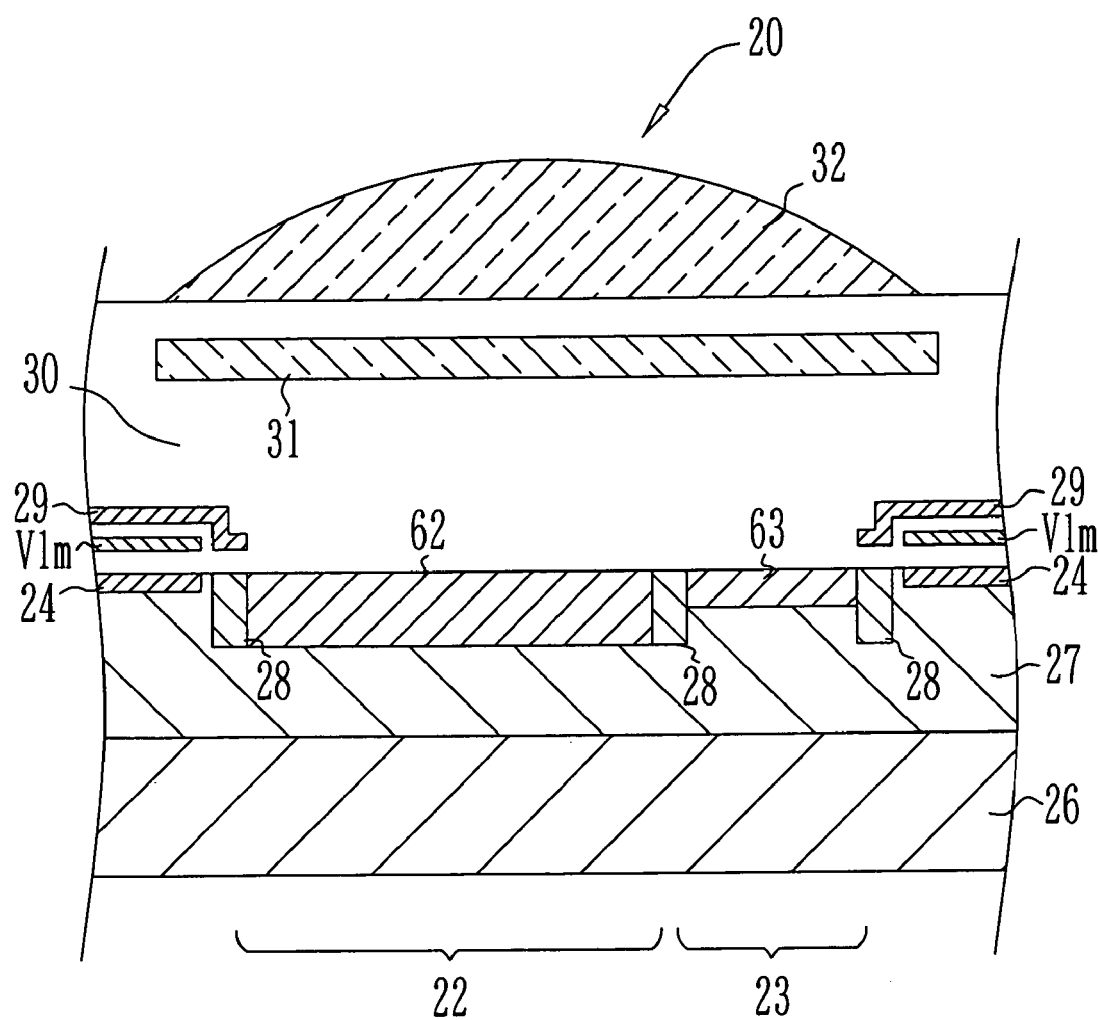
FIG. 9 is a cross-sectional schematic view explaining another embodiment of an image sensor applied to the present invention.

In the above embodiment, the spectral sensitivity characteristics of the main and sub pixels 22, 23 are different from each other because of the difference in thickness of the color filters above each pixel. However, as shown in FIG. 9, for example, the respective spectral sensitivity characteristics of main and sub photosensitive portions 62 and 63 may be differentiated by differentiating the thickness in an optical axis direction of the main and sub pixels 22, 23 from each other.

Additionally, in the above embodiment, although the thickness of the color filters above the main and sub photosensitive portions 22*a*, 23*a* is different from each other because of providing a second color filter 33 above the sub photosensitive portion 23*a*, it is possible to use a single color filter in which the thickness thereof is partially differentiated. Further, in the above embodiment, the thickness of the color filter above the sub photosensitive portion 23*a* is thicker than the color filter above the main photosensitive portion 22*a*; however, the color filter above the main photosensitive portion 22*a* may be thicker than the color filter above the sub photosensitive portion 23*a*.

Moreover, in the above embodiment, each pixel is arranged in a honeycomb manner; however, it may be arranged in a square matrix form. Furthermore, the CCD type image sensor of the present invention is also applicable to a MOS type image sensor.

In the above embodiment, although the digital still camera is applied to the present invention, the present invention is not limited only to the digital still camera, but is also applicable to, for example, a scanner.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging apparatus having a correction circuit for correcting white balance according to the type of illumination light source, said imaging apparatus comprising:
    an image sensor having plural red pixels to convert red light photoelectrically, plural green pixels to convert green light photoelectrically, and plural blue pixels to convert blue light photoelectrically, said red, green and blue pixels being arranged in a predetermined pattern;
    each of said red, green, and blue pixels having a main pixel and a sub pixel, spectral sensitivity of said main and sub pixels being different from each other; and
    a determiner for determining the type of said illumination light source by comparing a first signal being read from said main pixel with a second signal being read from said sub pixel.

2. The imaging apparatus as claimed in claim 1, wherein said determiner compares a first addition signal with a second addition signal of each color, said first addition signal is the sum of said first signal read from each of said main pixels of the same color, and said second addition signal is the sum of said second signal read from each of said sub pixels of the same color.

3. The imaging apparatus as claimed in claim 2, wherein said determiner performs said comparison for each color, and determines said illumination light source as a different type of light source when at least one ratio of each color is not a predetermined value determined for each color.

4. The imaging apparatus as claimed in claim 3, wherein said determiner determines the kind of said different type of light source according to difference between said first addition signal and a value, which is calculated by multiplying a coefficient to said second addition signal of the color used for discrimination of said different type of light source.

5. The imaging apparatus as claimed in claim 1, wherein a light receiving area of each of said main pixel is larger than that of each of said sub pixel.

6. The imaging apparatus as claimed in claim 5, wherein said imaging apparatus is a digital camera.

7. The imaging apparatus as claimed in claim 6, wherein said red, green and blue pixels are arranged in a honey comb manner.

8. The imaging apparatus as claimed in claim 5, wherein a sensitivity wave-length range of said sub pixel is smaller than that of said main pixel.

9. The imaging apparatus as claimed in claim 8, wherein said main pixel includes a color filter and a main photosensitive portion; and
    wherein each of said sub pixel includes said color filter common to the color filter of said main pixel, and a sub photosensitive portion.

10. The imaging apparatus as claimed in claim 9, wherein said main and sub photosensitive portions are respectively different in thickness in an optical axis direction, in order to differentiate each of said spectral sensitivity.

11. The imaging apparatus as claimed in claim 9, wherein said sub pixel has a sub filter connected to said color filter in order to differentiate each of said spectral sensitivity.

12. The imaging apparatus as claimed in claim 9, wherein the thickness of said color filter in the area facing said main photosensitive portion and the thickness of said color filter in the area facing said sub photosensitive portion are different in order to differentiate each of said spectral sensitivity.

* * * * *